United States Patent
Ong

(10) Patent No.: US 12,150,049 B2
(45) Date of Patent: Nov. 19, 2024

(54) SYSTEMS AND METHODS FOR POWER CONTROL IN A GATEWAY DEVICE

(71) Applicant: Comcast Cable Communications, LLC, Philadelphia, PA (US)

(72) Inventor: Ivan Ong, Malvern, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 426 days.

(21) Appl. No.: 17/645,933

(22) Filed: Dec. 23, 2021

(65) Prior Publication Data

US 2023/0209458 A1  Jun. 29, 2023

(51) Int. Cl.
*H04W 52/02* (2009.01)
*H02J 3/00* (2006.01)

(52) U.S. Cl.
CPC ......... *H04W 52/0206* (2013.01); *H02J 3/001* (2020.01)

(58) Field of Classification Search
CPC ............................ H04W 52/0206; H02J 3/001
USPC ......................................................... 370/311
See application file for complete search history.

(56) References Cited

FOREIGN PATENT DOCUMENTS

WO   WO-2020113256 A1 * 6/2020 ......... H04B 7/18517

* cited by examiner

*Primary Examiner* — Gbemileke J Onamuti
(74) *Attorney, Agent, or Firm* — BakerHostetler

(57) ABSTRACT

A disruption of power on a network may be detected. A gateway device of the network may transition to a low power mode. The gateway device may determine inactive physical interfaces on the gateway device and shut down the inactive physical interfaces. The gateway device may determine inactive wireless interfaces on the gateway device and shut down the inactive wireless interfaces. The gateway device may determine actively operating physical interfaces on the gateway device and reduce a modulation rate associated with the actively operating physical interfaces for a first time. The gateway device may determine actively operating wireless interfaces on the gateway device and reduce a modulation rate associated with the actively operating wireless interfaces for the first time. The gateway device may shut down the actively operating physical interfaces after the first time. The gateway device may shut down the actively operating wireless interfaces after the first time.

20 Claims, 5 Drawing Sheets

```
┌─────────────────────────────────────────────────────────────────────┐
│ Receive, at a gateway device comprising a plurality of components,  │
│ a wireless signal indicating a disruption of primary power          │
│ associated with the gateway device                                   │
│                              402                                     │
└─────────────────────────────────────────────────────────────────────┘
                                  │
                                  ▼
┌─────────────────────────────────────────────────────────────────────┐
│ Cause, based on the receiving the indication of the disruption of   │
│ primary power, a reduction, for a first period of time, of a        │
│ modulation rate associated with one or more of the plurality of     │
│ components 404                                                       │
└─────────────────────────────────────────────────────────────────────┘
                                  │
                                  ▼
┌─────────────────────────────────────────────────────────────────────┐
│ Cause, based on determining an expiration of the first period of    │
│ time, backup power to the one or more of the plurality of           │
│ components to be removed 406                                         │
└─────────────────────────────────────────────────────────────────────┘
```

SYSTEMS AND METHODS FOR POWER CONTROL IN A GATEWAY DEVICE

BACKGROUND

Gateway devices typically have backup batteries that may provide a limited source of power in the event of a power outage. Additionally, in the case of gateway devices that offer voice services, the FCC has mandated the gateway devices to offer backup power capable of lasting for up to 24 hours on standby, and the gateway devices must be able to receive and send a minimum number of calls. Difficulties arise in managing shutdown of active sessions to ensure a good user experience, while minimizing the amount of the backup power used to do so, in order to maximize the length of time the backup power will last. Improvements in power control in gateway devices are needed.

SUMMARY

Systems, methods, and apparatus are described herein for power control in a gateway device. The gateway device may be transitioned from a normal power mode to a low power mode in the event of a disruption of primary power (e.g., alternating current (A/C) power) to the gateway device.

Based on a determination of a disruption of primary power (e.g., A/C power), a gateway device may determine one or more active components associated with the gateway device. The gateway device may cause, based on the determination of the one or more active components, a reduction, for a first time period, of a modulation rate associated with the one or more active components. The gateway device may cause, based on an expiration of the first time period, backup power to the one or more active components to be removed. The gateway device may further determine one or more inactive components associated with the gateway device. The gateway device may cause, based on determining the one or more inactive components, backup power to the one or more inactive components to be removed. The gateway device may cause the reduction in the modulation rate associated with the one or more active components by causing a reduction in a quantity of spatial streams associated with the one or more active components. Additionally, or alternatively, the gateway device may cause the reduction in the modulation rate associated with the one or more active components by changing from a first modulation and coding scheme to a second modulation and coding scheme.

This summary is provided to introduce a selection of concepts in a simplified form that are further described below in the Detailed Description. This Summary is not intended to identify key features or essential features of the claimed subject matter, nor it is intended to be used to limit the scope of the claimed subject matter. Furthermore, the claimed subject matter is not limited to limitations that solve any or all disadvantages noted in any part of the disclosure.

BRIEF DESCRIPTION OF THE DRAWINGS

FIG. 4 shows an example method.

Aspects of the disclosure will now be described in detail with reference to the drawings, wherein like reference numbers refer to like elements throughout, unless specified otherwise.

DETAILED DESCRIPTION

In order to provide a continuously operating wireless network and minimize the disruption to the network in the event of a disruption of primary power (e.g., A/C power), a backup power system, such as a backup battery, may be associated with a gateway device. However, transitioning from operating under normal power conditions to operating while using the backup power system may be cumbersome and may face competing objectives. On one hand, with enough backup power, the gateway device may operate normally for the duration of the disruption of primary power. This may be impractical, however, due to the amount of power required to operate the gateway device normally for a prolonged period of time, especially when compared to the amount of power able to be stored in a typical backup battery device. On the other hand, the amount of backup power required during operation of a low power mode may be minimized by powering down any non-critical functions at the gateway device upon determining the disruption of primary power. This may be impractical, however, due to the disruption caused for users actively associated with the gateway device. So, it is desirable to develop a system to minimize the disruption to users actively associated with the gateway device in a low power mode, while also minimizing the amount of power required for the backup battery device to run the gateway device in a low power mode for a specified period of time.

As technologies evolve, new systems and devices arise that may more readily increase the capacity of backup power sources. Additionally, new technologies are increasing the ability of devices, such as gateway devices, to manage the transition from a normal operating mode to a low power mode when the gateway device experiences a disruption of primary power.

Disclosed herein are systems, apparatuses, and methods for transitioning a gateway device to a low power mode in the event of a disruption of primary power to the gateway device. The transition may comprise determination and shutdown of one or more inactive components of the gateway device to provide a reduction in power consumption by the gateway device. Upon determining a disruption of primary power, the gateway device may identify one or more components actively associated with the gateway device. The one or more active components may be allowed to remain active for a specified period of time upon determining the primary power disruption.

Figure 1:
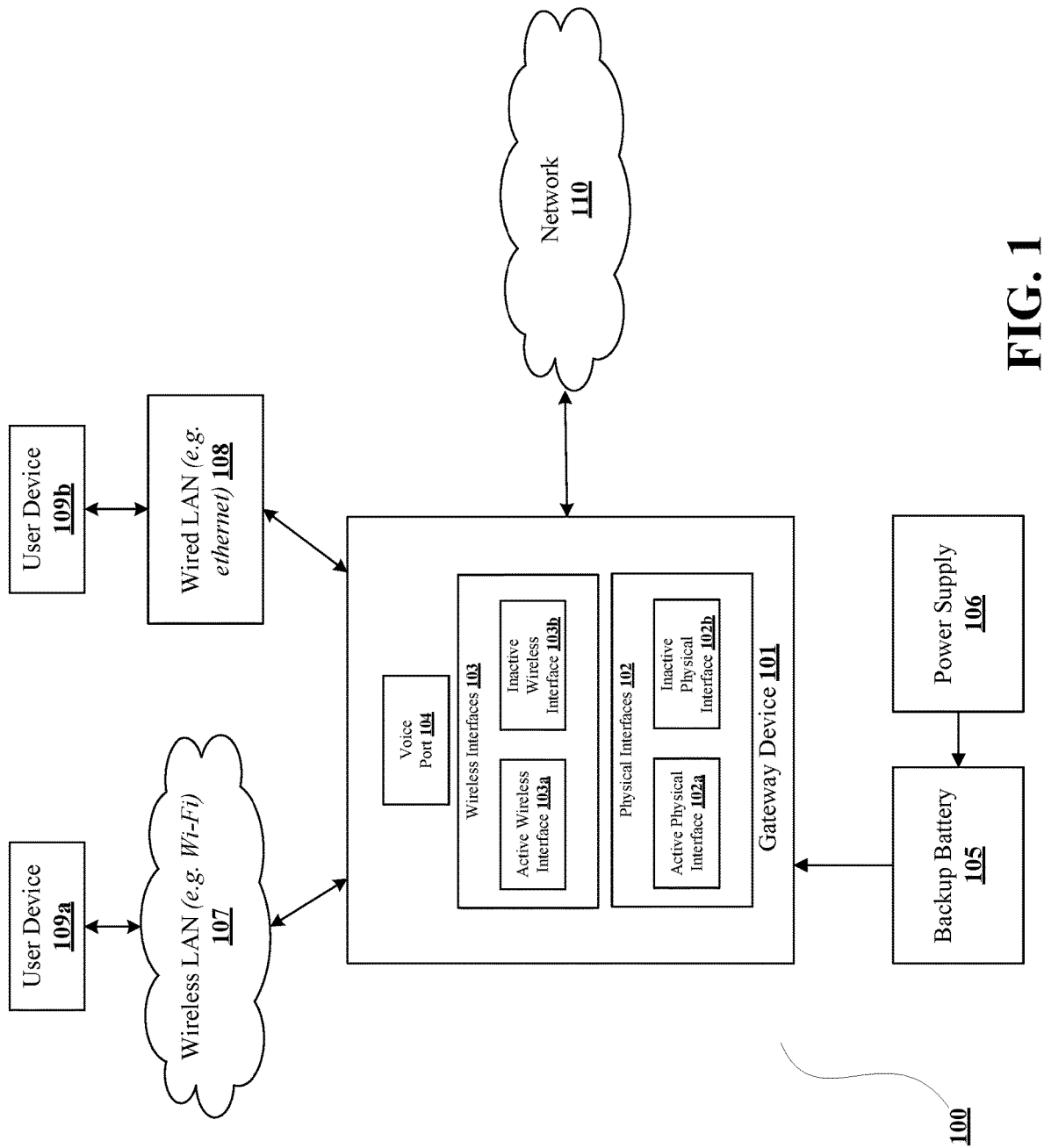
FIG. 1 shows an example system.

FIG. 1 shows an example system in which the present systems, methods, and apparatus may be implemented. As shown in FIG. 1, a system 100 may comprise at least one gateway device 101. For example, the gateway device 101 may be configured to operate a wireless network, such as a Wi-Fi router, a cable modem, or both a Wi-Fi router and a cable modem. The gateway device 101 may comprise one or more physical interfaces 102. The gateway device 101 may further comprise one or more wireless interfaces 103. The gateway device 101 may further comprise one or more voice ports 104. One or more user devices 109 may be in communication with the gateway device 101 through a local area network (LAN). The LAN may be a wireless LAN (WLAN) 107, for example a Wi-Fi LAN. The LAN may be a wired LAN 108, such as an ethernet LAN or fiber optic LAN. The gateway device 101 may be in communication with a network 110, for example a Wide Area Network (WAN). The one or more user devices 109 may be in communication with the network 110 via the gateway device 101. Furthermore, the gateway device 101 may be coupled with a backup battery 105. The backup battery may be coupled with a power supply 106. The gateway device 101 may receive power from the power supply 106.

The gateway device 101 may provide access between users and user devices 109 at a premises to a network 110. Non-limiting examples of a network 110 include an internet service provider (ISP) network, a cloud computing network, a local area network (LAN), a metropolitan area network (MAN), a Wi-Fi network, a wide area network (WAN), a satellite network, the internet, or any combination thereof. The network may facilitate communication among multiple entities, including user devices 109 at a premises, devices outside of the premises, content providers, and the like. The user devices 109 may receive content from the network 110. The content may be transmitted through the network 110 to the user devices 109 through, for example, a WLAN 107 and/or a wired LAN 108. The gateway device 101 may receive content from the network 110. The content may be transmitted from the user devices 109 to the gateway device 101 through, for example, the WLAN 107 and/or the wired LAN 108. Content transmitted through the network 110 may comprise, as non-limiting examples, video data, audio data, text data, or the like.

Video data may comprise any video content produced for viewer consumption. Video content may comprise pre-recorded video programs, live video programs streamed to viewers, or any other video content broadcast to users via radio, cable, satellite, or other method. Audio data may comprise any audio content produced for listener consumption. Audio content may comprise pre-recorded songs or other pre-recorded audio data, live audio programs streamed to listeners, such as a radio talk show, a music performance, or the like. Text data may comprise any textual or pictorial content produced for viewer consumption. Textual data may comprise, for example, e-books, comics, or other pictures associated with video content.

The system 100 may comprise a gateway device 101. The gateway device 101 may comprise a computing device. The gateway device 101 may comprise one or more physical interfaces 102. The gateway device 101 may comprise one or more wireless interfaces 103. The gateway device 101 may comprise one or more voice ports 104. The gateway device 101 may be configured to enable one or more user devices 109 to establish a wired or wireless connection to the gateway device 101 for purposes of communicating with the gateway device 101 and other network apparatuses beyond the gateway device 101, such as the network 110. The gateway device 101 may establish a wired connection to the one or more user devices 109, for example the one or more user devices 109 may be connected to an ethernet cable that is coupled with the gateway device 101. Thus, the one or more user devices 109 may be in communication with the gateway device 101 through the wired ethernet connection. For purposes of communicating with the gateway device 101 via the wired ethernet connection, the gateway device 101 may be configured to implement the IEEE 802.3 ("Ethernet") technology, or the gateway device 101 may be configured to implement any other wired local area network technology.

The gateway device 101 may establish a wireless connection to the one or more user devices 109, for example the one or more user devices 109 may be in communication with a WLAN 107, for example a Wi-Fi network, that is in communication with the gateway device 101. For purposes of communicating wirelessly, the gateway device 101 may implement a wireless access technology, such as the IEEE 802.11 ("Wi-Fi") radio access technology. Any applicable portion of the IEEE 802.11 ("Wi-Fi") radio access technology may be implemented, including but not limited to, 802.11n, 802.11ac, and 802.11ax standards. In other implementations, other radio access technologies may be employed, such as IEEE 802.16 or 802.20 ("WiMAX"), IEEE 802.15.4 (e.g., "Zigbee" and/or "Bluetooth"), or 802.15.3c ("UWB").

The gateway device 101 may comprise a router. The gateway device 101 may comprise a modem. The gateway device 101 may be configured to provide a first connection to the network 110 via a service provider network, such as a network operated by a cable television system operator or other communications service provider. The service provider network may comprise any of a variety of types of networks, such as, for example, a coaxial cable network, a fiber-optic cable network, a hybrid fiber-coaxial (HFC) network, a satellite transmission channel, a DSL connection, or the like.

The gateway device 101 may be configured to communicate with any number of different types of user devices 109. As non-limiting examples, the one or more user devices 109 may comprise, for example, a computer, a laptop, a tablet, a mobile phone, a PDA, a gaming console, or the like. The one or more user devices 109 may be associated with one or more users.

The one or more physical interfaces 102 of the gateway device 101 may comprise any number of different types of physical interfaces. As non-limiting examples, a physical interface 102 may be an ethernet port, a multimedia over coaxial alliance (MoCA) port, a DOCSIS port, and the like. The one or more physical interfaces 102 may comprise one or more active physical interfaces 102a. For example, a user device 109b may be in communication with the gateway device 101 via a wired LAN 108, such as with an ethernet cable. The wired LAN 108 may be associated with an active physical interface 102a, such as an ethernet port, allowing the user device 109b to communicate with the network 110 via the wired LAN 108 and via the gateway device 101. The one or more physical interfaces 102 may comprise one or more inactive physical interfaces 102b. For example, an inactive physical interface 102b may not be in communication with any user devices 109b and may not be in communication to any other devices, for example an ethernet cable.

The one or more wireless interfaces 103 of the gateway device 101 may comprise any number of different types of wireless interfaces. As non-limiting examples, wireless interfaces may include Wi-Fi networks, pod devices in communication with the gateway device 101 to create a mesh network, band steering, dynamic channel selection, active channel selection, telemetry, and the like. The one or more wireless interfaces 103 may comprise one or more active wireless interfaces 103a. For example, a user device 109a may be in communication with the gateway device 101 via a WLAN 107. The WLAN 107 may be associated with an active wireless interface 103a, allowing the user device 109a to communicate with the network 110 via the WLAN 107 and via the gateway device 101. The one or more active wireless interfaces 103a may comprise any number of active sessions associated with the gateway device 101. The one or more wireless interfaces 103 may comprise one or more inactive wireless interfaces 103b. For example, an inactive wireless interface 103b may not be in communication with any user devices 109a and may not be operating any active sessions.

The one or more voice ports 104 of the gateway device 101 may comprise any type of system or device that enables voice services over a gateway device 101. For example, the voice port may be in communication with the gateway device 101 to allow for voice over internet protocol (VoIP) services. The voice port 104 may facilitate the gateway device 101 to communicate with a telephony device. The voice port 104 may provide for a user device 109 to make and/or receive a telephony call via the gateway device 101.

The backup battery 105 may be any battery known to store and provide an external source of power separate from a primary source of power. The backup battery 105 may be any device capable of storing energy and providing electrical current to the gateway device 101. For example, the backup battery 105 may be a lithium-ion battery, an alkaline battery, or the like. The backup battery 105 may be coupled to the gateway device 101 by any method able to allow the backup battery 105 to provide electrical current to the gateway device 101. The backup battery 105 may provide direct current (DC) electricity to the gateway device 101. The backup battery 105 may provide power to the gateway device 101 if the gateway device 101 is unable to receive power from a primary power source. The gateway device 101 may operate in a low power mode if receiving power from the backup battery 105. The backup battery 105 may provide power to the gateway device 101 for a specified period of time. The backup battery 105 may provide power to the gateway device 101 until the backup battery 105 runs out of power. The backup battery 105 may provide power to the gateway device 101 until a primary source of power is supplied to the gateway device 105. Upon renewal of primary power to the gateway device 101, the gateway device may return to a normal operating mode.

The power supply 106 may be coupled to the backup battery 105. The power supply 106 may be coupled to the gateway device 101 through the backup battery 105. The power supply 106 may be any type of power supply capable of converting alternating current (AC) electricity to DC electricity and further modulating the voltage of the electricity.

Figure 2:
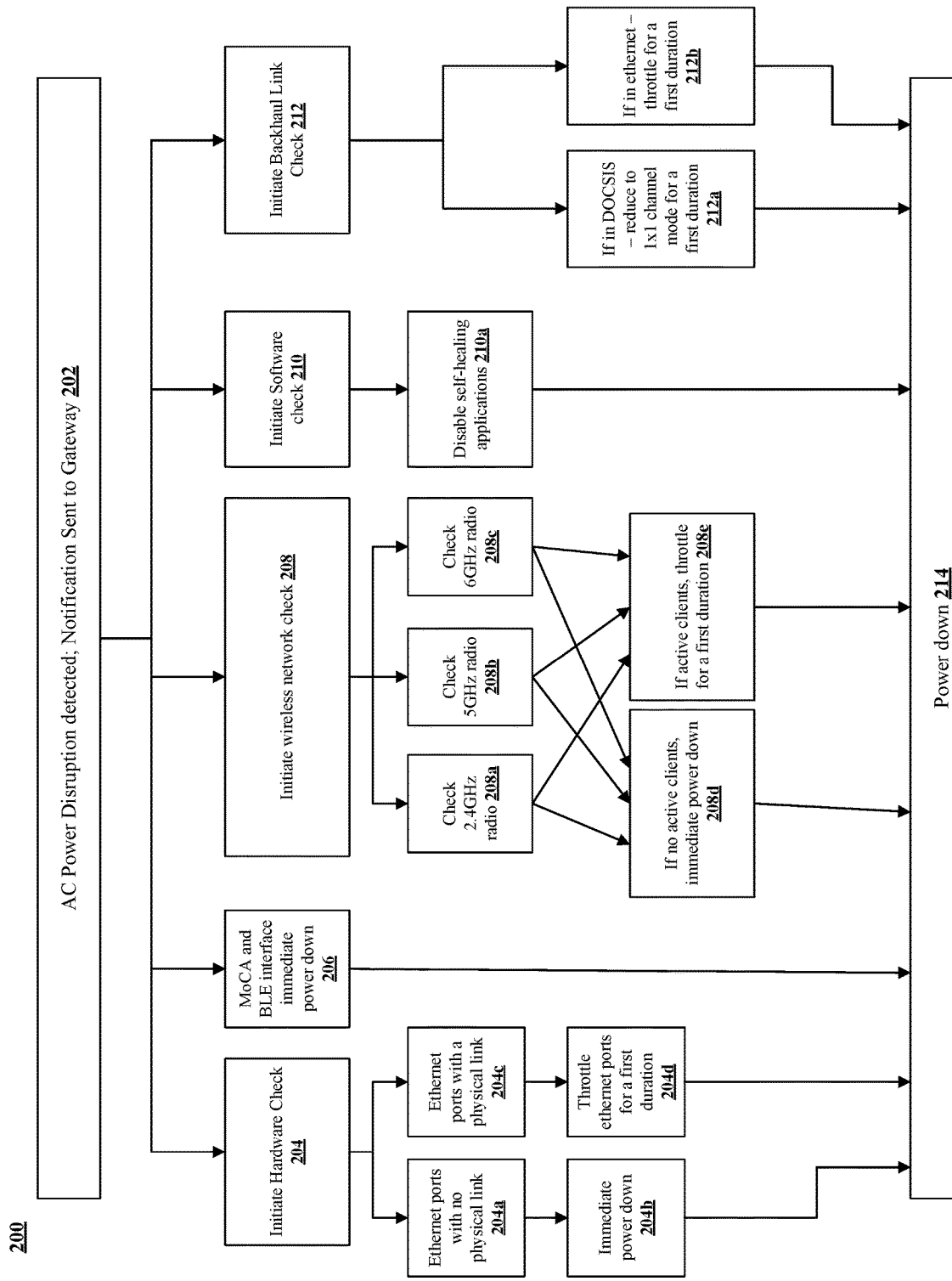
FIG. 2 shows an example method.

FIG. 2 shows an example method 200. The method may be implemented, for example, in the example system illustrated in FIG. 1. The method 200 may be used to facilitate transition of a gateway device 101 to a low power mode in the event of a disruption of primary (e.g., A/C) power. The method 200 may achieve the transition from normal power mode to low power mode with minimal disruptions to existing sessions and interfaces. The method 200 may be performed, for example, by the gateway device 101. At step 202, a gateway device 101, such as the gateway device 101 of FIG. 1, may determine a disruption of power from a primary power source. For example, the disruption of power may indicate a disruption of A/C power associated with the gateway device. The disruption of power may be due to any number of different reasons, such as a power supply being disconnected from a wall outlet, a loss of power to a premises, or a loss of power for any other reason. The disruption of power may be a partial loss of power, or the disruption of power may be a complete loss of power. Furthermore, the disruption of power may be determined in multiple ways. For example, the gateway device 101 may determine a drop in voltage, the gateway device 101 may receive a notification from the backup battery 105, the notification indicating the disruption of primary power, or the gateway device 101 may receive a notification from any other device indicating the disruption of primary power. A notification may be sent to the gateway device 101 wirelessly, for example the notification may be sent using a ZigBee channel.

The gateway device 101 may switch from using a primary power source to using a backup power source. For example, the backup power source may be a backup battery 105, or the backup power source may be any other suitable source of power, such as a backup generator. The backup battery 105 may have a limited amount of power available to continue operation of the gateway device 101. Therefore, the gateway device 101 may minimize power consumption to maximize the amount of time the backup battery 105 may provide backup power to the gateway device 101. For example, the backup battery 105 may have to provide backup power to the gateway device 101 for a minimum time of 24 hours in a low power mode. The backup battery may have to provide backup power to the gateway device 101 in the low power mode for any amount of time, for example 1 hour, 2 hours, 6 hours, 12 hours, two days, one week, or any other amount of minimum time. A low power mode may be a mode of the gateway device 101, in which the gateway device 101 does not operate some functions that are available during a normal power mode. The gateway device 101 may provide limited functionality in the low power mode. For example, in the low power mode, the gateway device 101 may or may not be able to operate a WLAN connection. Additionally, during the low power mode, the gateway device 101 may or may not be able to operate a wired LAN connection. During the low power mode, the gateway device 101 may be able to provide voice calling functionality by operating a voice port 104. In an active state, the voice port 104 may be able to connect a voice call associated with the gateway device 101 to a party outside of an area associated with the gateway device 101.

At step 204, the gateway device 101 may initiate a hardware check to determine the activity level associated with each hardware component associated with the gateway device 101. For example, the gateway device 101 may initiate a link layer check to determine which, if any, hardware components and physical interfaces 102 have active connections. For example, the gateway device 101 may check each ethernet port to determine which ethernet ports, if any, have active connections.

At step 204a, the gateway device 101 may determine one or more physical interfaces in an inactive state 102b. For example, the gateway device 101 may determine one or more ethernet ports with no physical connection to a device.

At step 204b, based on the determination of one or more physical interfaces in an inactive state 102b, the gateway device 101 may power down the one or more inactive physical interfaces 102b. For example, the gateway device 101 may cause the backup power to the one or more inactive physical interfaces to be removed. Even in an inactive state, the physical interfaces may consume some power. Thus, by powering down inactive physical interfaces 102b, the gateway device 101 may conserve power during the disruption of power event.

At step 204c, the gateway device 101 may determine one or more physical interfaces in an active state 102a. For example, the gateway device 101 may determine one or more ethernet ports actively connected to devices. The active physical interfaces 102a may provide active connections to the gateway device 101 for user devices 109.

At step 204d, based on the determination of the one or more physical interfaces in an active state 102a, the gateway device 101 may throttle an amount of power provided to the one or more active physical interfaces 102a for a period of time associated with the gateway device 101 transitioning to a low power mode. For example, the gateway device 101 may throttle an amount of power to an active ethernet LAN port during the transition, before powering down the active ethernet LAN port. In one example, the duration of time the throttled amount of power is supplied prior to powering down may be one minute, 30 seconds, 15 seconds, ten seconds, 2 minutes, 5 minutes, or any other suitable period of time. The gateway device 101 may reduce the amount of power provided to the active physical interface 102a by, for example, throttling the physical layer (PHY) rate of data associated with an ethernet LAN port. For example, during a normal mode of operation of the gateway device 101, the ethernet LAN port may have access to a PHY rate of one or more gigabits per second. During the duration of time while the gateway device 101 transitions to the low power mode, the PHY rate of data associated with the ethernet LAN port may be throttled to a lower speed, for example 100 megabits per second. However, the PHY rate associated with the ethernet LAN port may be throttled to an amount greater or less than 100 megabits per second during the transition time.

Furthermore, throttling the PHY rate associated with the ethernet LAN port may cause another device, for example an upstream device such as a cable modem termination system (CMTS) to throttle and/or lower a modulation rate of the data supplied to the gateway device 101. The modulation rate of the data may be described by a modulation and coding scheme (MCS). The MCS may influence the data rate of a connection. The modulation rate may describe the amount of information present in a single block of data. Many different modulation types may be used to influence the data rate associated with the gateway device 101. Examples of types of modulation may be shift keying (SK), amplitude modulation (AM), and the like. Furthermore, SK modulation may comprise phase SK (PSK), frequency SK (FSK), or amplitude SK (ASK). The different types of SK modulation may be associated with multiple different rates of modulation. For example, PSK may be binary (BPSK), quadrature (QPSK), or any other suitable amount. AM may, for example, comprise quadrature AM (QAM). QAM may be used, in one example, in wireless networking schemes, such as in the IEEE 802.11 Wi-Fi standards.

QAM may comprise conveying two orthogonal signals carrying information, preventing the two signals from interfering with one another, while allowing the two signals to be demodulated at a receiver. The rate of modulation may be increased or decreased, based on the capabilities of the network. For example, higher order QAM types may provide more information per symbol; however, higher order QAM types may also require more power to operate, as well as more robust noise and/or signal capabilities to mitigate errors. In one example, 256-QAM may provide 8 bits of information per symbol. In one example, 1024-QAM may provide 10 bits of information per symbol. Accordingly, 1024-QAM may provide more information per symbol in a network than the amount of information per symbol provided in a 256-QAM type, but the 1024-QAM type may require more power to operate than the 256-QAM type. The present system may use any modulation type, including BPSK, QPSK, 8PSK, 16-QAM, 64-QAM, 256-QAM, 1024-QAM, or any other suitable modulation type.

Based on the reduction in input at the gateway device 101, the CMTS, or any other upstream device, may reduce the modulation rate associated with the data supplied to the gateway device 101. For example, the CMTS may reduce the modulation rate of the data supplied to the gateway device 101 by changing from a 1024-QAM MCS to a 16-QAM MCS, from a 256-QAM MCS to a BPSK MCS, or any combination thereof. Therefore, due to the decreased power and error rate requirements associated with a lower modulation type, the gateway device 101 may provide a lower amount of power to an active physical interface, such as an active ethernet port connection, during the transition to the low power mode. The gateway device 101 may power down the active physical interface at step 214.

At step 206, the gateway device 101 may determine a MoCA interface, such as a MoCA port, associated with the gateway device 101. In response to the disruption of power event, the gateway device 101 may power down the MoCA port. The gateway device 101 may further determine a Bluetooth (BLE) interface, such as a BLE radio, associated with the gateway device 101. In response to the disruption of power event, the gateway device 101 may power down the BLE radio.

At step 208, the gateway device 101 may initiate a wireless network check to determine the activity level associated with each wireless component associated with the gateway device 101. For example, the gateway device 101 may initiate a check for clients connected to the gateway device 101, such as user devices 109. The gateway device 101 may determine which, if any, wireless network components are inactive, and the gateway device 101 may determine which, if any, wireless network components are active.

At step 208a-208c, the gateway device 101 may check each type of wireless network component for active connections. For example, the gateway device 101 may comprise one or more 2.4 GHz radios 208a, one or more 5 GHz radios 208b, and one or more 6 GHz radios 208c.

At step 208d, the gateway device 101 may determine one or more wireless network components in an inactive state 103b. For example, the gateway device 101 may determine that one or more 2.4 GHz radios at the gateway device 101 are in an inactive state, that one or more 5 GHz radios at the gateway device 101 are in an inactive state, that one or more 6 GHz radios at the gateway device 101 are in an inactive state, or that any combination of the one or more 2.4 GHz, one or more 5 GHz, and one or more 6 GHz radios are in an inactive state. Based on the determination that one or more of the wireless network components are in an inactive state 103b, the gateway device 101 may power down the one or more inactive wireless network components associated with the gateway device 101. For example, the gateway device 101 may cause backup power to the one or more inactive wireless network components to be removed.

At step 208e, the gateway device 101 may determine one or more wireless network components in an active state 103a. For example, the gateway device 101 may determine one or more 2.4 GHz radios, one or more 5 GHz radios, one or more 6 GHz radios, or any combination thereof, are actively operating a wireless network session. For example, a user device 109 may be connected to the gateway device 101 via a WLAN 107, in communication with one or more of the radios 208a-208c.

At step 208e, based on the determination of the one or more wireless network components in an active state 103a, the gateway device 101 may throttle an amount of power provided to the one or more active wireless network components 103a of the gateway device 101 for a first time period, for example a duration of time in which the gateway device 101 transitions to a low power mode. For example, the gateway device 101 may throttle an amount of power to one or more 2.4 GHz radios, one or more 5 GHz radios, one or more 6 GHz radios, or any combination thereof, actively operating a wireless network session. In one example, the duration of time the throttled amount of power is supplied prior to powering down may be one minute, 30 seconds, 15 seconds, ten seconds, 2 minutes, 5 minutes, or any other suitable time period. The gateway device 101 may reduce the amount of power provided to the active wireless network components 103a by, for example, throttling the modulation rates associated with the active wireless network components 103a. The gateway device 101 may reduce the amount of power provided to the active wireless network components 103a by, for example, lowering the transmit power associated with the active wireless network components 103a.

The modulation rate of data in a wireless network may be described by the MCS. The MCS may influence the data rate of a wireless network connection. The modulation rate may describe the amount of information present in a single block of data. Many different modulation types may be used to influence the data rate associated with a wireless network connection at the gateway device 101. Examples of types of modulation may be shift keying (SK), amplitude modulation (AM), and the like. Furthermore, SK modulation may comprise phase SK (PSK), frequency SK (FSK), or amplitude SK (ASK). The different types of SK modulation may be associated with multiple different rates of modulation. For example, PSK may be binary (BPSK), quadrature (QPSK), or any other suitable amount. AM may, for example, comprise quadrature AM (QAM). QAM may be used, in one example, in wireless networking schemes, such as in the IEEE 802.11 Wi-Fi standards.

QAM may comprise conveying two orthogonal signals carrying information, preventing the two signals from interfering with one another, while allowing the two signals to be demodulated at a receiver. The rate of modulation may be increased or decreased, based on the capabilities of the network. For example, higher order QAM types may provide more information per symbol; however, higher order QAM types may also require more power to operate, as well as more robust noise and/or signal capabilities to mitigate errors. In one example, 256-QAM may provide 8 bits of information per symbol. In one example, 1024-QAM may provide 10 bits of information per symbol. Accordingly, 1024-QAM may provide more information per symbol in a network than the amount of information per symbol provided in a 256-QAM type, but the 1024-QAM type may require more power to operate than the 256-QAM type. The present system may use any modulation type, including BPSK, QPSK, 8PSK, 16-QAM, 64-QAM, 256-QAM, 1024-QAM, or any other suitable modulation type.

During normal power conditions at the gateway device 101, active wireless network connections may operate under any suitable 802.11 Wi-Fi standard. For example, the active wireless network connections may operate under the 802.11ax standard, also known as the Wi-Fi 6 standard. The 802.11ax standard may describe the standards associated with WLANs at the gateway device 101. 802.11ax Wi-Fi networks may operate under modulation schemes including 1024-QAM, which may be an improvement in the number of bits of information sent per block of data compared to other Wi-Fi standards, such as 802.11ac and 802.11n.

The gateway device 101 may determine the disruption of primary (e.g., A/C) power 202. The gateway device 101 may throttle the power associated with the wireless network components, for example by reducing the modulation rate associated with the data transmitted on the wireless network components. In a further example, the network may be transitioned from operating under the 802.11ax Wi-Fi standard to the 802.11ac Wi-Fi standard. In doing so, the modulation rate of data associated with the wireless network components may be reduced by changing the MCS type from, for example 1024-QAM to 16-QAM, or from 1024-QAM to QPSK, or any other suitable change in MCS type.

Under the 802.11ax standard, each of the wireless network components, such as the one or more 2.4 GHz radios, the one or more 5 GHz radios, and the one or more 6 GHz radios, may each be associated with multiple transmission antennas and multiple receiver antennas. Based on being associated with multiple transmission antennas and multiple receiver antennas, the wireless network components may each be able to transmit multiple independent and separately coded data signals, also known as multiplexing. Each of the multiplexed signals may be known as a spatial stream. Each of the wireless network components in the 802.11ax system may be associated with up to one spatial stream, two spatial streams, four spatial streams, or eight spatial streams. At step 208e, the gateway device 101 may reduce the number of spatial streams available to each of the wireless network components. For example, at step 208e, the gateway device 101 may reduce the number of spatial streams associated with the one or more 2.4 GHz radios, the one or more 5 GHz radios, the one or more 6 GHz radios, or any combination thereof, by 50%, to a total of four spatial streams each, to a total of two spatial streams each, or to a total of one spatial stream each. Finally, at step 214, the gateway device 101 may power down each of the active sessions of the wireless network components, including reducing the number of spatial streams associated with each of the wireless network components to zero.

At step 210, the gateway device 101 may initiate a software check. The gateway device 101 may check the gateway device 101 for any components, such as self-healing components, mesh networking components, band steering components, channel selection components, and the like. In response to determining the disruption of primary power, at step 210a, the gateway device 101 may disable the self-healing components, the mesh networking components, the band steering components, the channel selection components, and the like.

At step 212, the gateway device 101 may check one or more components associated with the backhaul link from the gateway device 101 to, for example, a core network. The backhaul link may comprise a data over cable service interface specification (DOCSIS) connection. Additionally, or alternatively, the backhaul link may comprise an ethernet connection.

At step 212a, the gateway device 101 may determine the gateway device 101 is operating in a DOCSIS mode. In the case that the gateway device 101 is operating in the DOCSIS mode, the gateway device 101 may reduce a power supplied to a DOCSIS port. For example, the modulation rate of the DOCSIS mode may be lowered. The DOCSIS may be transitioned from a higher modulation rate, such as an orthogonal frequency-division multiplexing (OFDM) or orthogonal frequency division multiple access (OFDMA) modulation type to a lower rate modulation type, such as a QAM, a QPSK, or a BPSK modulation type. Furthermore, the gateway device 101 may be associated with multiple spatial streams. The gateway device 101 may reduce the modulation of data associated with the gateway device 101 by, for example, reducing the quantity of spatial streams to a lower quantity of spatial streams, up to and including a single spatial stream. However, if, at step 212a, the gateway device 101 is not operating in a DOCSIS mode, for example, if the gateway device 101 is operating in an ethernet WAN mode, the gateway device 101 may power down the DOCSIS port.

At step 212*b*, the gateway device 101 may be operating in an ethernet mode. In the case that the gateway device 101 is operating in the ethernet mode, the gateway device 101 may reduce a power supplied to the ethernet port. For example, the modulation type of the ethernet port may be lowered. The ethernet port may be transitioned from a higher modulation rate to a lower modulation rate, such as a 16-QAM, a QPSK, or a BPSK modulation type. However, if, at step 212*b*, the gateway device 101 is not operating in an ethernet mode, the gateway device 101 may power down the ethernet port.

At step 214, the gateway device 101 may complete the transition to the low power mode. The gateway device 101 may determine that one or more components associated with the gateway device 101 are powered on. The gateway device 101 may power down the remaining one or more components. For example, the gateway device 101 may cause the backup power to the remaining one or more components to be removed. The gateway device 101 may optionally allow one or more components to continue operating at a full power or at a reduced power during the low power mode. For example, the voice port 104 may continue operating at a full power or a reduced power during the low power mode, allowing voice calls to be connected and completed during the low power mode. Additionally, one or more ZigBee channels may be enabled during the low power mode to allow for communications via the one or more ZigBee channels. Any number of components at the gateway device 101 may remain operational during the low power mode.

Figure 3:
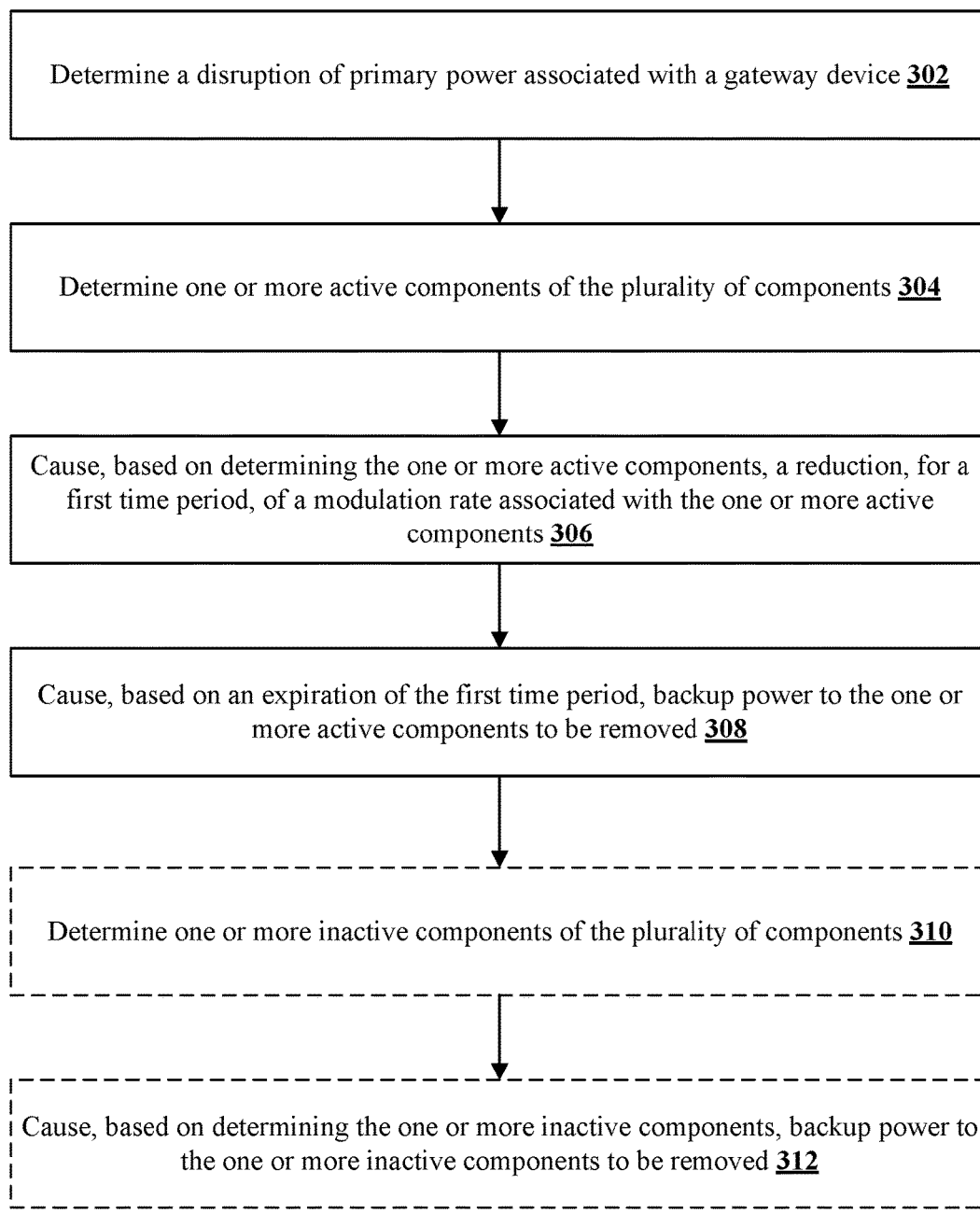
FIG. 3 shows an example method.

FIG. 3 shows an example method 300. The method may be implemented, for example, in the example system illustrated in FIG. 1. The method 300 may be used to facilitate transition of a gateway device 101 to a low power mode in the event of a disruption of primary (e.g., A/C) power. The method 300 may achieve the transition from normal power mode to low power mode with minimal disruptions to existing sessions and interfaces. The method 300 may be performed, for example, by the gateway device 101.

The gateway device 101 may be associated with a local network. For example, the gateway device 101 may be associated with a wired LAN, a WLAN, or both a wired LAN and a WLAN. One or more user devices may communicate with the gateway device 101 via the wired LAN or the WLAN. The gateway device 101 may provide a LAN at a premises. The user devices may be located at the premises. The gateway device 101 may comprise one or more physical interfaces, one or more wireless interfaces, and one or more voice ports. The one or more voice ports may allow for voice calls to be completed. One or more user devices may communicate with one or more additional user devices at the premises via the LAN of the gateway device 101. One or more user devices may communicate with other systems or devices outside of the premises via the LAN of the gateway device 101.

At step 302, the gateway device 101 may determine a disruption of primary power. The disruption of primary power may be determined by the gateway device 101. Alternatively, the disruption of primary power may be determined by a device or system operating in communication with the gateway device 101. For example, the disruption of primary power may be determined at a backup battery device in communication with the gateway device 101. The backup battery device may send a notification to the gateway device 101 to notify the gateway device 101 of the disruption of primary power. The notification may be a wireless message. The wireless message may be sent over a ZigBee channel, or the wireless message may be sent via any other suitable wireless communication mode.

At step 304, the gateway device 101 may determine one or more active components. For example, an ethernet port that is actively in communication with another device may be in an active state. Additionally, a wireless interface in an active session with a client, such as a user device, may be determined to be in an active state.

At step 306, the gateway device 101 may cause, based on determining the one or more active components, a reduction, for a first time period, of a modulation rate associated with the one or more active components. For example, the gateway device 101 may reduce the modulation rate associated with the one or more physical interfaces. The gateway device 101 may reduce the modulation rate associated with the one or more wireless interface components. The gateway device 101 may reduce an amount of transmit power associated with the wireless interface components.

Based on the determination of the one or more physical interfaces in an active state, the gateway device 101 may reduce power to the one or more active physical interfaces for the first time period. For example, the gateway device 101 may reduce power to an active ethernet LAN port for the first time period. The first time period may be 15 seconds, 30 seconds, one minute, two minutes, five minutes, or any other suitable period of time. The gateway device 101 may reduce the amount of power provided to the active physical interface by throttling the data rate associated with the active physical interface. For example, prior to the determination of the low power mode, the ethernet port may have access to a data rate of one or more gigabits per second. During the transition to the low power mode, the data rate associated with the ethernet port may be throttled down to a lower speed, such as 100 megabits per second. However, the data rate during the transition to the low power mode may be throttled to an amount greater than or less than 100 megabits per second.

Additionally, causing a reduction of power supplied to the active physical interface may cause a reduction of the modulation rate associated with data at the active physical interface. For example, reducing the modulation rate may comprise changing from a first MCS to a second, different MCS with a lower modulation complexity. For example, the first MCS may be 1024-QAM, 256-QAM, or 64-QAM. During the transition to the low power mode, and during the reduction in the modulation rate associated with the active physical interface, the MCS may be changed to the second MCS, such as 16-QAM, 8PSK, QPSK, or BPSK.

Based on the determination of the one or more wireless interface components in an active state, the gateway device 101 may cause a reduction of a modulation rate associated with the one or more active wireless interface components. For example, reducing the modulation rate may comprise changing from a first MCS to a second, different MCS with a lower modulation complexity. In a further example, the first MCS may follow the modulation rates associated with the 802.11ax, 802.11ac, or 802.11n standards. The first MCS may be 1024-QAM, 256-QAM, or 64-QAM. During the transition to the low power mode, the MCS may be changed to the second MCS, such as 16-QAM, 8PSK, QPSK, or BPSK.

Furthermore, during the transition to the low power mode, the number of spatial streams associated with the active wireless interface components may be reduced. Prior to the transition, the active wireless interface components may be associated with multiple spatial streams, including two spatial streams, four spatial streams, or eight spatial streams.

In the transition to the low power mode, the number of spatial streams associated with the active wireless interface components may be reduced by 50%, may be reduced to one spatial stream, or any other suitable reduction.

In step 308, the gateway device 101 causes, based on an expiration of the first time period, backup power to the one or more active components to be removed. The gateway device 101 may determine a completion of the transition to the low power mode. The gateway device 101 may determine an expiration of the first time period. Based on the determination, the gateway device 101 may cause backup power to be removed from the one or more active physical components and the one or more active wireless interface components. For example, the gateway device 101 may cause backup power associated with the one or more active physical components or the one or more active wireless components to be removed.

At step 310, the gateway device 101 may alternatively determine one or more of the plurality of components in an inactive state. For example, the gateway device 101 may determine one or more physical components associated with the gateway device 101 in an inactive state. In one example, the gateway device 101 may determine that an ethernet port is in an inactive state, such as an ethernet port that is not in communication with another device or system. Additionally, the gateway device 101 may determine one or more wireless components associated with the gateway device 101 in an inactive state. For example, the gateway device 101 may determine a wireless radio that is not actively connected to a client.

At step 312, the gateway device 101 may alternatively remove power to the one or more inactive components, by, for example, causing backup power to the one or more inactive components to be removed. For example, the gateway device 101 may, in response to determining that the ethernet port is not actively in communication with another device, power down the ethernet port. The gateway device 101 may repeat the power down of all other inactive physical interfaces on the gateway device 101. Even when the physical interface components are inactive, the physical interface components may consume some power. Therefore, powering down the inactive physical interface components may reduce the amount of power required at the gateway device 101. Additionally, the gateway device 101 may, in response to determining that the one or more wireless components associated with the gateway device 101 are in an inactive state, power down the one or more inactive wireless network components.

FIG. 4 shows an example method 400. The method may be implemented, for example, in the example system illustrated in FIG. 1. The method 400 may be used to facilitate transition of a gateway device 101 to a low power mode in the event of a disruption of primary (e.g., A/C) power. The method 400 may achieve the transition from normal power mode to low power mode with minimal disruptions to existing sessions and interfaces. The method 400 may be performed, for example, by the gateway device 101.

The gateway device 101 and the backup battery may be in communication via a wired connection. The wired connection may permit the backup battery to provide backup power to the gateway device 101 in a disruption of power event. The gateway device 101 and the backup battery may be in communication via a wireless connection. For example, the gateway device 101 and the backup battery may be in communication via a ZigBee channel, or any other suitable wireless communication mode. The ZigBee channel may permit the gateway device 101 to send messages to the backup battery, and the ZigBee channel may permit the backup battery to send messages to the gateway device 101.

The gateway device 101 may be associated with a local network. For example, the gateway device 101 may be associated with a wired LAN, a WLAN, or both a wired LAN and a WLAN. One or more user devices may communicate with the gateway device 101 via the wired LAN or the WLAN. The gateway device 101 may provide a LAN at a premises. The user devices may be located at the premises. The gateway device 101 may comprise one or more physical interfaces, one or more wireless interfaces, and one or more voice ports. The one or more voice ports may allow for voice calls to be completed. One or more user devices may communicate with one or more additional user devices at the premises via the LAN of the gateway device 101. One or more user devices may communicate with other systems or devices outside of the premises via the LAN of the gateway device 101.

At step 402, the gateway device 101 may receive a wireless signal indicating a disruption of primary power to the gateway device 101. The wireless signal may be received from the backup battery device. The wireless signal may be received over a ZigBee channel, or the wireless signal may be received by any other suitable wireless communication mode.

At step 404, the gateway device 101 may cause a reduction of a modulation rate associated with one or more components associated with the gateway device 101 for a first period of time. The one or more components may be one or more physical components, one or more wireless components, or any combination thereof. Reducing the modulation rate associated with the one or more components may comprise reducing power provided to the one or more components. For example the reducing the modulation rate may comprise reducing an amount of transmit power provided to a wireless networking component associated with the gateway device 101. The reducing the modulation rate may reduce the rate of data supplied to the one or more components, such as reducing the rate of data from one or more gigabits per second to less than one gigabit per second. The reducing the modulation rate may comprise reducing the modulation of data provided to the one or more second components, for example changing the MCS type from 1024-QAM to 16-QAM, from 256-QAM to QPSK, or from 64-QAM to BPSK, or any combination thereof. The reducing the modulation rate may reduce the number of spatial streams available to a wireless component on the gateway device 101, such as reducing a number of spatial streams from four to one.

At step 406, the gateway device 101 may cause, based on determining an expiration of the first period of time, backup power to the one or more components associated with the gateway device 101 to be removed. The causing the backup power to be removed may comprise shutting down the one or more second components. Based on the causing the backup power to be removed, the gateway device 101 may operate in a low power mode. The gateway device 101 may operate in a low power mode while the disruption of power from a primary power source remains. The gateway device 101 may operate in a low power mode while receiving power from the backup battery device.

A gateway device 101 may be coupled to a battery device. For example, the gateway device 101 may be a gateway device 101 at a location. The gateway device 101 may be configured to operate a wireless network at the location. The gateway device 101 may provide a LAN comprising a wired LAN and/or a WLAN for user devices at the location to communicate with a network, such as a WAN. The battery device may be a backup battery device. The backup battery device may provide power to the gateway device 101 during a disruption of power event. The backup battery device may be in wired communication with the gateway device 101. The backup battery may provide backup power to the gateway device 101 via the wired connection. The backup battery may be in wireless communication with the gateway device 101. For example, the wireless communication between the gateway device 101 and the backup battery may occur over a ZigBee channel, or any other suitable wireless network. The battery may be configured to provide a minimum amount of backup power to the gateway device 101 for a minimum period of time. For example, the backup battery may be configured to provide an amount of backup power suitable for the gateway device 101 to operate in a low power mode for a minimum of 24 hours. The backup battery may provide backup power suitable for the gateway device 101 to operate in a low power mode for a minimum of one hour, six hours, 12 hours, 48 hours, 72 hours, or any other duration of time.

The gateway device 101 may receive, from the battery device, a wireless notification indicating a disruption of primary power. The wireless signal may be received over a ZigBee channel, or the wireless signal may be received by any other suitable wireless communication mode.

The gateway device 101 may shutdown one or more inactive components associated with the gateway device 101. For example, the gateway device 101 may cause backup power to the one or more inactive components to be removed. The one or more inactive components at the gateway device 101 may be physical interfaces associated with the gateway device 101, wireless interfaces associated with the gateway device 101, or other hardware or software components associated with the gateway device 101.

The gateway device 101 may determine one or more physical components associated with the gateway device 101 in an inactive state. For example, the gateway device 101 may determine that an ethernet port is in an inactive state, such as an ethernet port that is not in communication with another device. Additionally, or alternatively, the gateway device 101 may determine one or more wireless components associated with the gateway device 101 in an inactive state. For example, the gateway device 101 may determine a wireless radio not actively connected to a session with a client.

The gateway device 101 may shutdown the one or more inactive components associated with the gateway device 101. For example, the gateway device 101 may power down the inactive ethernet port, or the gateway device 101 may power down the inactive wireless radio, or both. In one example, the gateway device 101 may cause backup power to the one or more inactive components to be removed.

The gateway device 101 may reduce a modulation rate associated with one or more active components associated with the gateway device 101. The one or more active components may be one or more physical components, one or more wireless components, or any combination thereof. Reducing the modulation rate associated with the one or more active components may comprise reducing power provided to the one or more active components. The reducing the modulation rate may reduce the rate of data supplied to the one or more active components, such as reducing the rate of data from one or more gigabits per second to less than one gigabit per second. The reducing the modulation rate may comprise reducing the modulation of data provided to the one or more active components, for example by changing the MCS type from 1024-QAM to 16-QAM, from 256-QAM to QPSK, or from 64-QAM to BPSK, or any combination thereof. The reducing the modulation rate may reduce the number of spatial streams available to an active wireless component on the gateway device 101, such as reducing a number of spatial streams from four to one.

The gateway device 101 may shutdown the one or more active components associated with the gateway device 101. The shutdown may comprise removing power to the one or more active components. For example, the gateway device 101 may cause backup power to the one or more active components to be removed. Based on the shutting down the one or more active components, the gateway device 101 may operate in a low power mode. The gateway device 101 may operate in a low power mode for a duration of the gateway device 101 operating via backup power from the backup battery device.

Figure 5:
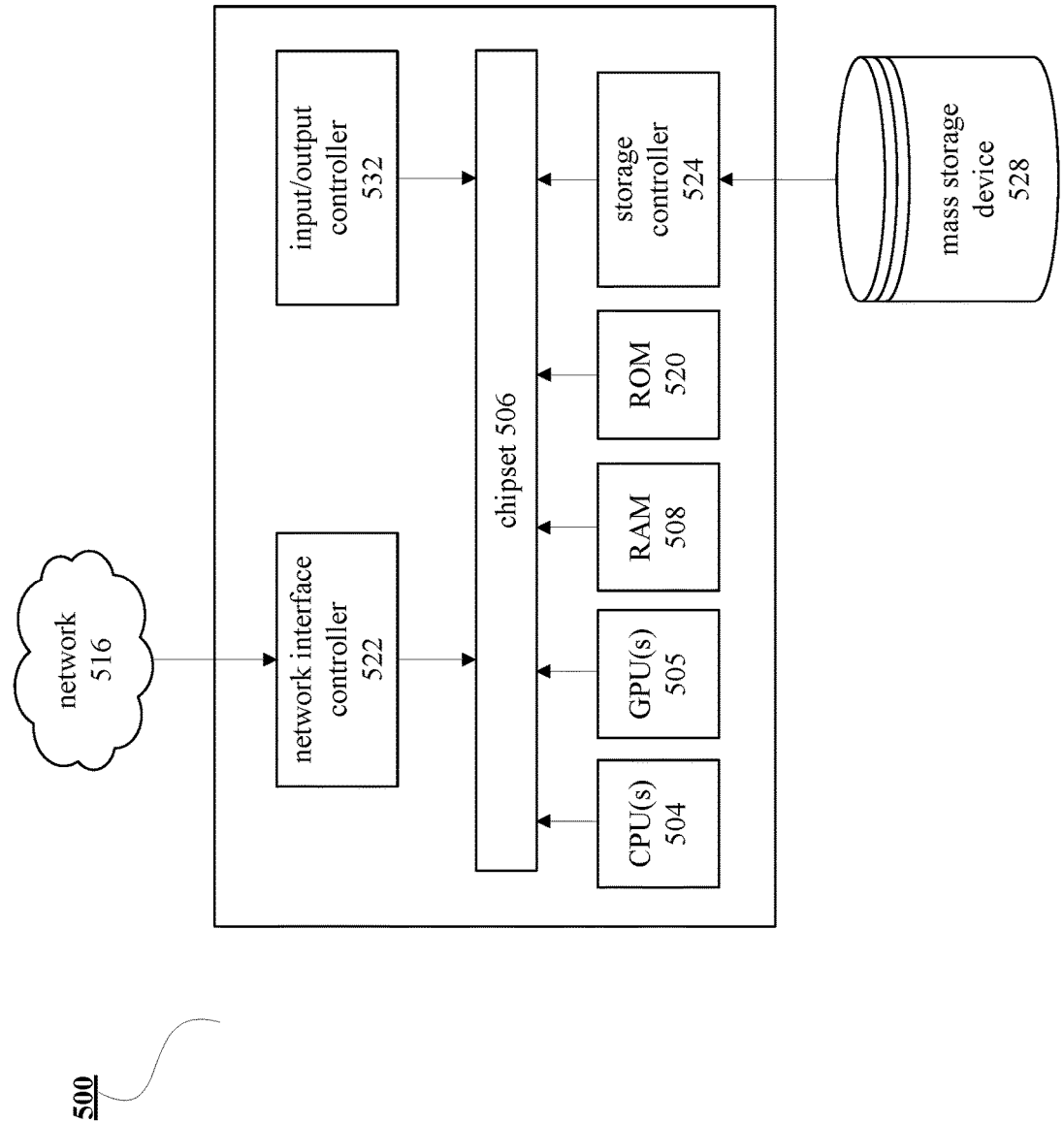
FIG. 5 shows an example computing system.

FIG. 5 shows an example computing device 500 that may represent any of the various devices or entities shown in FIG. 1, including, for example, gateway device 101, the backup battery 105, the power supply 106, the user devices 109a and 109b, or the network 110. That is, the computing device 500 shown in FIG. 5 may be any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the system of FIG. 1 or any of the methods described in relation to FIGS. 2-5.

The computing device 500 may comprise a baseboard, or "motherboard," which is a printed circuit board to which a multitude of components or devices may be connected by way of a system bus or other electrical communication paths. One or more central processing units (CPUs or "processors") 504 may operate in conjunction with a chipset 506. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, or the like.

The CPU(s) 504 may be augmented with or replaced by other processing units, such as GPU(s) 505. The GPU(s) 505 may comprise processing units specialized for but not necessarily limited to highly parallel computations, such as graphics and other visualization-related processing.

A chipset 506 may provide an interface between the CPU(s) 504 and the remainder of the components and devices on the baseboard. The chipset 506 may provide an interface to a random-access memory (RAM) 508 used as the main memory in the computing device 500. The chipset 506 may provide an interface to a computer-readable storage medium, such as a read-only memory (ROM) 520 or non-volatile RAM (NVRAM) (not shown), for storing basic routines that may help to start up the computing device 500 and to transfer information between the various components and devices. ROM 520 or NVRAM may also store other software components necessary for the operation of the computing device 500 in accordance with the aspects described herein.

The computing device 500 may operate in a networked environment using logical connections to remote computing nodes and computer systems of the system 100. The chipset 506 may comprise functionality for providing network connectivity through a network interface controller (NIC) 522. A NIC 522 may be capable of connecting the computing device 500 to other computing nodes over the system 100. It should be appreciated that multiple NICs 522 may be present in the computing device 500, connecting the computing device to other types of networks and remote computer systems. The NIC 522 may be configured to implement a wired local area network technology, such as IEEE 802.3 ("Ethernet") or the like. The NIC 522 may also comprise any suitable wireless network interface controller capable of wirelessly connecting and communicating with other devices or computing nodes on the system 100. For example, the NIC 522 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 500 may be connected to a mass storage device 528 that provides non-volatile storage (i.e., memory) for the computer. The mass storage device 528 may store system programs, application programs, other program modules, and data, which have been described in greater detail herein. The mass storage device 528 may be connected to the computing device 500 through a storage controller 524 connected to the chipset 606. The mass storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on a mass storage device 528 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 528 is characterized as primary or secondary storage or the like.

For example, the computing device 500 may store information to the mass storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may read information from the mass storage device 528 by detecting the physical states or characteristics of one or more particular locations within the physical storage units.

In addition to the mass storage device 528 described herein, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may comprise volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 528 may store other system or application programs and data utilized by the computing device 500.

The mass storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described herein. The computing device 500 may have access to computer-readable storage media storing computer-executable instructions, which, when executed by the computing device 500, may perform the methods described in relation to FIGS. 2-5.

A computing device, such as the computing device 500 depicted in FIG. 5, may also comprise an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not comprise all of the components shown in FIG. 5, may comprise other components that are not explicitly shown in FIG. 5, or may utilize an architecture completely different than that shown in FIG. 5.

As described herein, a computing device may be a physical computing device, such as the computing device 500 of FIG. 5. A computing device may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is not intended to be limiting.

As used in the specification and the appended claims, the singular forms "a," "an," and "the" comprise plural referents unless the context clearly dictates otherwise. Ranges may be expressed herein as from "about" one particular value, and/or to "about" another particular value. When such a range is expressed, another example may comprise from the one particular value and/or to the other particular value. It will be further understood that the endpoints of each of the ranges are significant both in relation to the other endpoint, and independently of the other endpoint.

"Optional" or "optionally" means that the subsequently described event or circumstance may or may not occur, and that the description comprises instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of.". "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any combination of the described methods.

As will be appreciated by one skilled in the art, the methods and systems may take the form of entirely hardware, entirely software, or a combination of software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described above with reference to block diagrams and flowcharts of methods, systems, apparatuses, and computer program products. It will be understood that each block of the block diagrams and flowcharts, and combinations of blocks in the block diagrams and flowcharts, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added or removed. The example systems and components described herein may be configured differently than described. For example, elements may be added to, removed from, or rearranged.

It will also be appreciated that various items are shown as being stored in memory or on storage while being used, and that these items or portions thereof may be transferred between memory and other storage devices for purposes of memory management and data integrity. Alternatively, some or all of the software modules and/or systems may execute in memory on another device and communicate with the shown computing systems via inter-computer communication. Furthermore, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms. Accordingly, the present invention may be practiced with other computer system configurations.

While the methods and systems have been described in connection with specific examples, it is not intended that the scope be limited to the specific examples set forth.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including matters of logic with respect to arrangement of steps or operational flow and the plain meaning derived from grammatical organization or punctuation.

It will be apparent to those skilled in the art that various modifications and variations may be made without departing from the scope or spirit of the present disclosure. Alternatives will be apparent to those skilled in the art from consideration of the specification and practices described herein. It is intended that the specification and example figures be considered as exemplary only, with a true scope and spirit being indicated by the following claims.

What is claimed is:

1. A method comprising:
    determining, by a gateway device comprising a plurality of components, a disruption of primary power associated with the gateway device;
    determining one or more active components of the plurality of components;
    causing, based on the determining the one or more active components, a reduction, for a first time period, of a modulation rate associated with the one or more active components; and
    causing, based on an expiration of the first time period, backup power to the one or more active components to be removed.

2. The method of claim 1, further comprising:
    determining one or more inactive components of the plurality of components; and
    causing, based on the determining the one or more inactive components, backup power to the one or more inactive components to be removed.

3. The method of claim 1, wherein the backup power is provided by a battery device.

4. The method of claim 2, wherein the determining the disruption of primary power to the gateway device comprises receiving an indication from a backup battery indicating the disruption of primary power.

5. The method of claim 1, wherein causing the reduction of the modulation rate associated with the one or more active components comprises causing a reduction in a quantity of spatial streams associated with the one or more active components.

6. The method of claim 5, wherein the quantity of spatial streams is associated with at least one of a quantity of transmitting antennas or a quantity of receiving antennas associated with the one or more active components.

7. The method of claim 1, wherein causing the reduction of the modulation rate associated with the one or more active components comprises changing from a first modulation and coding scheme (MCS) to a second MCS that is different from the first MCS.

8. The method of claim 7, wherein the first MCS comprises at least one of 256 quadrature amplitude modulation (QAM) or 1024-QAM, and wherein the second MCS comprises at least one of binary phase shift keying, quadrature phase shift keying, or 16-QAM.

9. The method of claim 1, further comprising causing, based on the determining the disruption of primary power, backup power to be provided to at least one voice port or wide area network interface associated with the gateway device.

10. A method comprising:
    receiving, at a gateway device comprising a plurality of components, a wireless signal indicating a disruption of primary power associated with the gateway device;
    causing, based on the receiving the indication of the disruption of primary power, a reduction, for a first period of time, of a modulation rate associated with one or more of the plurality of components; and
    causing, based on determining an expiration of the first period of time, backup power to the one or more of the plurality of components to be removed.

11. The method of claim 10, wherein the one or more of the plurality of components are first components, further comprising:
    determining one or more second components of the plurality of components; and
    causing, based on the receiving the indication of the disruption of primary power, the backup power to the one or more second components to be removed.

12. The method of claim 10, wherein causing the reduction of the modulation rate associated with the one or more components comprises causing a reduction in a quantity of spatial streams associated with the one or more components.

13. The method of claim 12, wherein the quantity of spatial streams is associated with at least one of a quantity of transmitting antennas or a quantity of receiving antennas associated with the one or more components.

14. The method of claim 10, wherein causing the reduction of the modulation rate associated with the one or more components comprises changing from a first modulation and coding scheme (MCS) to a second MCS that is different from the first MCS.

15. The method of claim 14, wherein the first MCS comprises at least one of 256 quadrature amplitude modulation (QAM) or 1024-QAM, and wherein the second MCS comprises at least one of binary phase shift keying, quadrature phase shift keying, or 16-QAM.

16. A method comprising:
    determining, by a gateway device comprising a plurality of components, a disruption of primary power associated with the gateway device;
    determining one or more active components of the plurality of components;
    causing, based on the determining the one or more active components, a reduction, for a first time period, of a modulation rate associated with the one or more active components;
    determining one or more inactive components of the plurality of components; and
    causing, based on determining the one or more inactive components, backup power to the one or more inactive components to be removed.

17. The method of claim 16, wherein causing the reduction of the modulation rate associated with the one or more active components comprises causing a reduction in a quantity of spatial streams associated with the one or more active components.

18. The method of claim 17, wherein the quantity of spatial streams is associated with at least one of a quantity of transmitting antennas or a quantity of receiving antennas associated with the one or more active components.

19. The method of claim 16, wherein causing the reduction of the modulation rate associated with the one or more active components comprises changing from a first modulation and coding scheme (MCS) to a second MCS that is different from the first MCS.

20. The method of claim 16, further comprising causing, based on the determining the disruption of primary power, backup power to be provided to at least one voice port or wide area network interface associated with the gateway device.

\* \* \* \* \*